June 4, 1968 R. A. GRAMM 3,386,392
ADJUSTABLE TRAY APPARATUS
Filed May 11, 1967 2 Sheets-Sheet 1
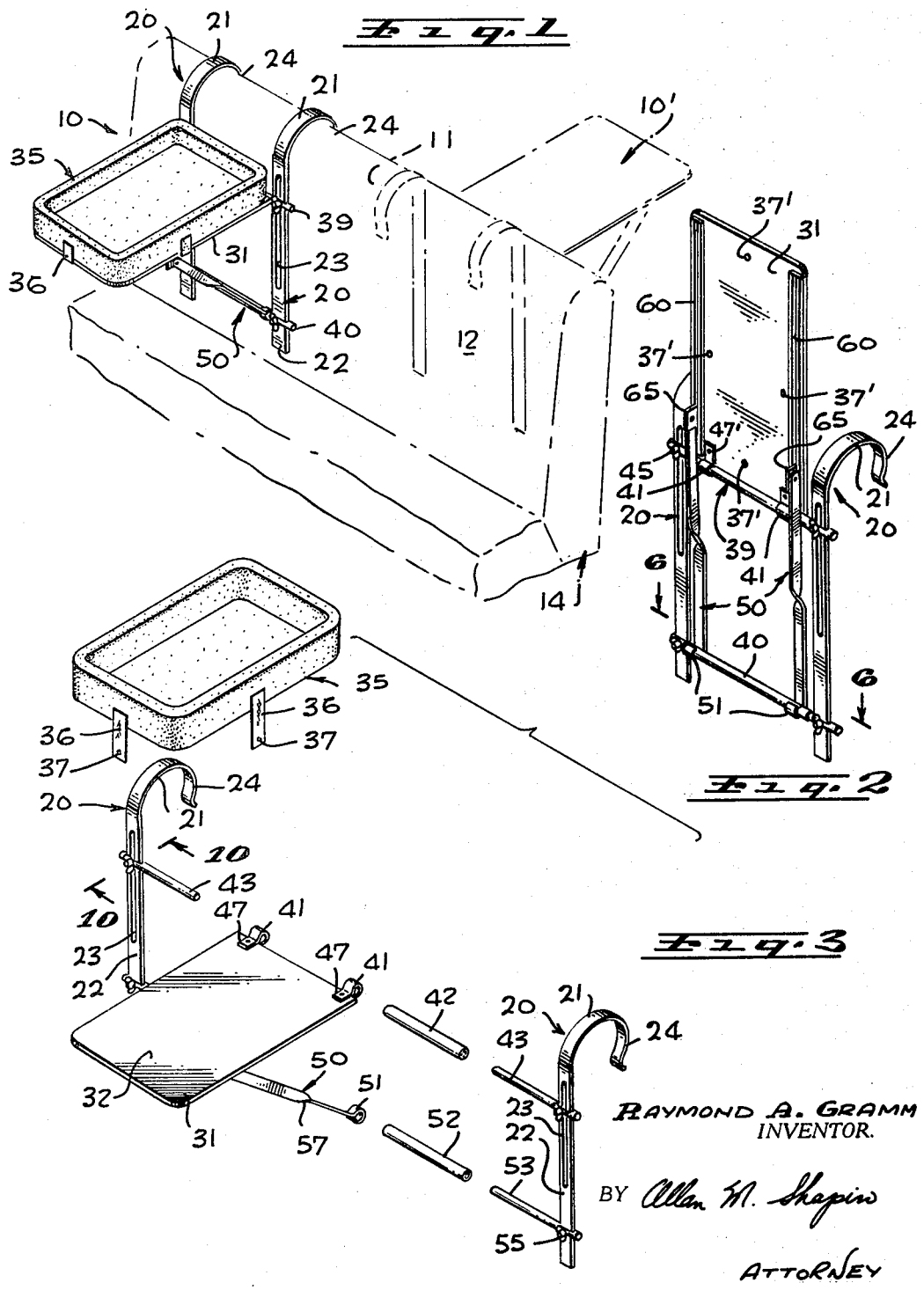
Raymond A. Gramm
INVENTOR.
BY Allan M. Shapiro
ATTORNEY June 4, 1968   R. A. GRAMM   3,386,392
ADJUSTABLE TRAY APPARATUS
Filed May 11, 1967   2 Sheets-Sheet 2
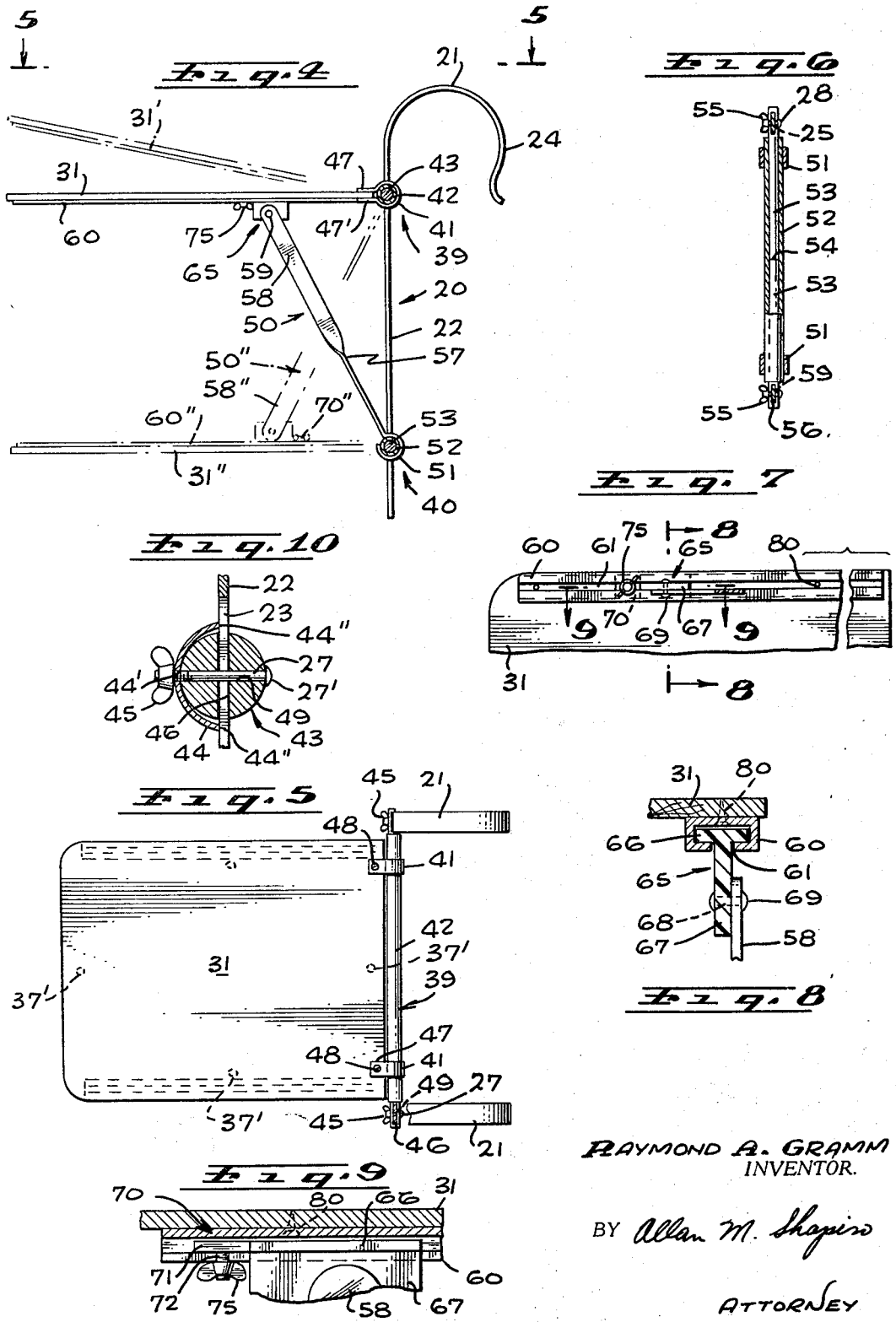

United States Patent Office 3,386,392
Patented June 4, 1968

3,386,392
ADJUSTABLE TRAY APPARATUS
Raymond A. Gramm, 14429 Califa St.,
Van Nuys, Calif. 91401
Filed May 11, 1967, Ser. No. 637,758
16 Claims. (Cl. 108—44)

ABSTRACT OF THE DISCLOSURE

Adjustable tray apparatus for supporting a pet or articles in vertically and angularly variable positions relative to an automobile seat or the like. A parallel pair of horizontal supports are removably secured in vertically adjustably spaced engagement at their ends with a parallel pair of generally vertical support members adapted to hook over the back of a seat in either forward or rearward orientation. A tray base is pivotally removably mounted on either of the horizontal supports and is provided with a pair of slotted tracks for slidably receiving the corresponding ends of a pair of angular supports, the other ends of which are pivotally removably mounted on the other horizontal support. The tray base is provided with a removable pet cushion. The apparatus is laterally adjustable to accommodate differently contoured seats and is collapsible and disassemblable.

Background of the invention (1) *Field of the invention.*—This invention relates to adjustable tray apparatus and, more particularly, to a pet tray adapted to be hooked over the back of an automobile seat and including a tray base, the height and angular orientation of which are adjustable.

(2) *Description of the prior art.*—As is well known, household pets such as dogs and cats enjoy riding in automobiles. Not unusually, the pet will perch on the back of the front seat of the vehicle, or on the back window ledge, positions high enough to enable the pet to view the passing scene through the windows of the car. These positions offer double hazards in that the animal may easily fall from its perch and obstruct the rear view of the driver. Then again, the pet may place its front paws on a window molding, also a hazardous position, or on the window itself, inhibiting the driver's view and possibly soiling the windows.

To reduce these hazards, automobile pet seats provide a support on which a pet may sit or lie, at a relatively high elevation, yet in a position which will not obstruct the driver's view. Here, the pet will be safe and comfortable and still may observe the passing scenery. While several pet seats have been suggested, designs of prior art devices suffer disadvantages which limit their usefulness.

As an example, U.S. Patent 1,912,514 to Curtis et al., describes a device for supporting animals. Although providing an elevated perch for an animal, the Curtis device utilizes straps contoured to the automobile seat back and including flat offset members designed to extend horizontally forward underneath a removable seat cushion. Such a device is difficult to install and remove and is not adapted for use in today's automobiles which often have non-removable seat cushions. Further, the device is clumsy to store and neither the height nor the orientation of the pet seat is adjustable.

Yet another automobile seat attachment for dogs is described in U.S. Patent 2,869,146 to Allison. This device comprises a flat plate, covered with chenille, on which the pet may perch. The plate is provided with support bars including curved positions adapted to hook over a seat back. Because of the fixed curvature and design of the support bars, the device can only be hooked forwardly of the automobile front seat and cannot be adjusted in height or angle.

The apparatus which forms the subject matter of this application provides an automobile pet seat which may be hooked in either forward or rearward orientation over the back of an automobile seat. The inventive pet tray is of a design which permits adjustment of both the height and angle of the pet seat, and which allows the device to be folded into a compact package when not in use.

Summary of the invention

In accordance with the present invention, adjustable tray apparatus is provided for supporting a pet or articles in vertically and angularly variable positions relative to an automobile seat or the like. A preferred embodiment for pets is described herein and comprises a pair of parallel, elongated vertical support members, each having one upper end curved to form a hook for engaging the top portion of a seat back. Extending horizontally between the vertical support members are a pair of upper and lower rod-like transverse support means. The position of the upper transverse support means may be adjusted vertically.

The pet tray includes a planar tray base, which may be covered with a low-skid material, and may have a raised ledge about its periphery. Attached to the back edge of the tray base are two or more tubular eyelets, which encircle the upper transverse support means so as to permit the tray base to pivot thereabout.

A pair of slotted tracks, each having a substantially C-shaped cross-section, are mounted on the bottom of the tray base, perpendicular to its back edge. A T-shaped member slides within each track and is pivotally connected to one end of an angular support arm. The other end of each support arm terminates in a tubular eyelet which encircles the lower transverse support means. Stop members, which also slide within the tracks, are provided to prevent the T-shaped members from sliding beyond a selectable point along each track. The transverse support means permits selective lateral spacing of the vertical support members for accommodating different seat back configurations.

Thus, a primary objective of the present invention is to provide a pet tray which may be hooked over the back of an automobile seat in a forward or rearward orientation, to provide a perch for a pet.

Another object of the present invention is to provide an adjustable automobile pet seat.

It is another object of the present invention to provide a pet tray which may be hooked over an automobile seat, and including a tray base which may be adjusted to a selectable angular orientation independent of the shape of the seat back.

Yet another object of the invention is to provide a pet tray, the base of which may be adjusted both as to elevation and angle.

Another object of the invention is the provision of an adjustable tray apparatus which can be readily converted into a variety of positional and utilitarian attitudes or orientations relative to an automobile seat back or the like.

A further object of the invention is to provide an automobile pet tray which may be folded into a convenient package when not in use, disassembled for shipment or merchandise packaging, and readily assembled.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

Brief description of the drawings

FIGURE 1 is a perspective view of convertible adjustable pet seat apparatus in accordance with the present invention, an automobile seat being shown in phantom, the apparatus being shown in solid lines disposed in front orientation relative to the seat and, in phantom lines, in rearward disposition relative thereto;

FIGURE 2 is a perspective view showing the apparatus in a collapsed position for carrying or storage;

FIGURE 3 is an exploded perspective view of the entire apparatus;

FIGURE 4 is a side elevation view of the apparatus, partly in section, with various positions being shown in phantom;

FIGURE 5 is a top plan view of the apparatus as seen along line 5—5 in FIGURE 4;

FIGURE 6 is a fragmentary sectional view, partly in elevation, as seen substantially along line 6—6 in FIGURE 2 and illustrating transverse support means;

FIGURE 7 is a fragmentary plan view illustrating the track mechanism;

FIGURE 8 is an enlarged fragmentary sectional view of the track mechanism as seen along line 8—8 in FIGURE 7;

FIGURE 9 is an enlarged fragmentary sectional view, partly in elevation, of the track mechanism as seen substantially along line 9—9 in FIGURE 7; and FIGURE 10 is an enlarged fragmentary sectional view showing a novel mechanism modification for releasably locking the horizontal support means to the vertical supports, as though seen along line 10—10 in FIGURE 3 if the latter were so modified.

Description of the preferred embodiment

Referring to the drawings, there is shown a preferred embodiment of the inventive pet tray apparatus 10. Pet tray 10 comprises a pair of elongated support members 20, each having an upper end curved to form a hook 21 of dimensions suitable for hooked engagement with the top 11 of the back 12 of a typical automobile seat 14. Extending between support members 20 are a pair of transverse members referenced generally at 39 and 40 in FIGURES 1 and 2, the position of upper transverse member 39 being adjustable longitudinally of support members 20.

Pet tray apparatus 10 further includes tray base 31, the rear edge of which is pivotally attached to transverse member 39 by eyelets 41. Tray base 31 preferably is covered with a low-skid material 32 (FIGURE 3) such as rubber. A pet pillow 35 is disposed on tray base 31 coextensively therewith and is provided with a plurality of straps 36 having snap fasteners 37 for releasable attachment to corresponding mating fastener elements 37' secured to the bottom surface of tray base 31. The pet pillow 35 preferably has the configuration illustrated and may be composed of cloth-covered foam rubber or plastic.

Forward support for tray base 31 is provided by a pair of angular support arms 50, each extending radially to lower transverse member 40. A pair of tracks 60 are secured in parallel, spaced apart relationship on the under surface of tray base 31 adjacent its lateral edges. One end of each of support arms 50 is pivotally attached to a sliding member 65 which is captured by and slidable along a respective one of tracks 60. The other end of each support arm 50 pivotally engages transverse member 40 by means of eyelet 51.

Various disassembled aspects of pet tray 10 may be seen by particular reference to the exploded view of FIG. 3. Note that support members 20 each comprise a seat straddling hook 21 and an elongate support portion 22 containing longitudinal slot 23. Seat straddling hooks 21 each preferably have a diameter slightly smaller than the thickness of typical automobile seat back 12, and include curved spring portions 24 adapted to resiliently engage the rear (of front) of the seat back. A hole 25 (see FIG. 6) extends transversely through the lower end of support portion 22. Upper transverse member 39 comprises tube 42 and a pair of rods 43; similarly, lower transverse member 40 comprises tube 52 and a pair of rod members 53. In a preferred embodiment, tubes 42 and 52 each have a length substantially the same as the width of tray base 31, and an inner diameter appropriate for a loose or slip fit over rods 43 and 53. Rods 43 and 53 themselves each have a diameter greater than the thickness of support members 20. Near one end, each of rods 43 is provided with a slot 46 (see FIG. 5) having a shape corresponding to the cross section of support members 20. A transverse hole 49, circular in cross section, extends through rod 43 perpendicular to and intersecting slot 46. Tube 52 and rods 53 are identical respectively to tube 42 and rods 43 so that they are interchangeable in assembly.

Rods 43 are attached to support members 20 by sliding support portion 22 through slot 46. Bolt 27 (see FIG. 5) extending through hole 49 and longitudinal slot 23, and fastened by wing nut 45, secures rod 43 to support member 20. It will be appreciated that the vertical position of rods 43 longitudinal of support members 20 may be adjusted by loosening nut 45, sliding rod 43 to the desired location along support portion 22 (limited, of course, by the extent of slot 23), and retightening nut 45. Similarly, rods 53 are attached by sliding support portion 22 through slot 56 (see FIG. 6). Bolt 28, extending through hole 59 in rod 53 and hole 25 in support member 22 and fastened by wing nut 55, secures rod 53 in place. The position of rod 53 along support members 20 is not adjustable.

Extending from the rear edge of tray base 31 are a pair of tubular eyelets 41, each having an inside diameter slightly larger than the outside diameter of tube 42. Eyelets 41 are mounted to base 31 by means of tabs 47 and 47' which extend respectively along the top and bottom surfaces of base 31. In a preferred embodiment, eyelets 41 each are formed from a single strip of metal, appropriately bent to have a shape such as that illustrated in FIGURE 4. Eyelets 41 may be secured in place by rivets or nuts and bolts 48 (see FIGURE 5) extending through tab 47, base 31 and tab 47'.

As shown also in FIGURE 3, support arm 50 is fashioned from a flat, elongated strip of metal and includes a 90° twist 57 approximately midway its ends. One end of each support arm 50 terminates in tubular eyelet 51 of the effectively same shape as eyelet 41 and having an inner diameter slightly larger than the outer diameter of tube 52.

The assembled appearance of transverse member 40 is shown in FIGURE 6. Rods 53 are of sufficient length that outer ends slots 56 extend beyond the corresponding ends of tube 52 when the inner ends (as designated at 54) are in abutment. Note also that eyelets 51, associated with support arms 50, encircle tube 52 sufficiently loosely to permit pivotal rotation of arms 50 about lower transverse member 40.

In a similar manner, the assembled appearance of upper transverse member 39 is shown in FIGURE 5, with the rod ends containing slots 46 extending beyond the respective ends of tube 42. Eyelets 41 encircle tube 42 sufficiently loosely to permit tray base 31 to rotate pivotally around transverse member 39.

As best shown in FIGURES 2 and 7, a pair of slotted tracks 60 are secured in spaced-apart, parallel relationship on the bottom surface of tray base 31. In a preferred embodiment, tracks 60 extend substantially the entire length of tray base 31 in a direction perpendicular to the back edge to which eyelets 41 are attached. As may be seen in FIGURE 8, track 60 has a substantially C-shaped cross section, with a hollow interior region which itself is rectangular in cross section. Tracks 60 are secured to tray base 31 by self-tapping, flat head screws 80 extending through the back or spine of track 60 into base 31.

Referring to FIGURES 2, 4, 7 and 8, disposed within each of tracks 60 is a T-shaped connecting member 65 adapted to slide longitudinally in track 60 and captured thereby. In a preferred embodiment, member 65 comprises a slide or cap portion 66 having a rectangular cross-section of dimensions commensurate with the hollow interior region of track 60. Depending from slide portion 66 is tongue portion 67, the thickness of which is slightly smaller than the width of slot 61 in track 60. A hole 68 extends transversely through tongue portion 67. An end 58 of each of arms 50 is pivotally attached to tongue portion 67 of the associated T-shaped connecting member 65 as by extending a rivet or equivalent fitting 69 through an appropriate hole in arm 50 and through hole 68 in tongue portion 67. Clearly, the diameter of fitting 69 should be smaller than the inside diameter of the holes through which it passes, to permit arm 50 to pivot freely with respect to T-shaped connecting member 65.

Also disposed within each of tracks 60 is a stop member 70 which functions to liimt the travel of connecting member 65 along track 60. Stop member 70 comprises slide member 71 and threaded shaft portion 72 depending at a right angle from slide member 71. Slide member 71 has a rectangular cross-section of dimensions commensurate with the hollow interior region of track 60, and thus may slide longitudinally within track 60. Shaft portion 72 preferably has a diameter slightly smaller than the width of slot 61 in track 60, and extends there beyond. Shaft portion 72 is threaded to receive a wing nut 75 which may be tightened to lock stop member 70 at a selected location along track 60.

As illustrated in the perspective view of FIGURE 1, the inventive automobile pet tray 10 may be hooked onto the back 12 of a typical automobile front seat 14, with tray base 31 in front orientation with respect to the seat. Pet tray 10 may be selectively positioned along back 12, e.g., it may be hooked at a location which provides minimum obstruction of the driver's view. Alternatively, pet tray 10 may be mounted in a rearward orientation, as shown in phantom at 10'; thus oriented, it may even be placed directly behind the driver.

When tray apparatus 10 is mounted in an automobile, and particularly when a pet is disposed thereon, support portions 22 will be forced against the seat back and assume an angle with respect to the vertical which corresponds to the slant of the front or rear face of seat back 12. It will be appreciated that the slant of seat back 12 may differ from car to car, or may even be adjustable within a particular automobile. Moreover, the slant of the rearward face of seat back 12 may be different from that of the forward face. Inventive tray apparatus 10 permits adjustment of the angular orientation of tray base 31 with respect to support members 20, thus permitting tray base 31 to be positioned either horizontally or at some other angular orientation regardless of the slant assumed by support members 20.

As an example, the side elevation view of FIGURE 4 shows tray base 31 at substantially a right angle to support portions 22. If the seat back is sloped, a new angular orientation such as that shown in phantom at 31' may be achieved in the following manner.

First, stop member 70 is released by loosening wing nut 75. Tray base 31 then is pivoted about transverse member 39 to the desired new angular position; as this is done, T-shaped connecting member 65 will slide along track 60. When the tray base 31 has been oriented to the desired angular position 31', stop member 70 is slid into a position abutting against connecting member 65 and locked into place by tightening wing nut 75. Tray base 31 will remain in the newly selected angular location, and will not rotate downward about transverse member 39, even when an animal is perched upon its upper surface.

The height of tray base 31 may be adjusted in several ways. For example, first loosening wing nuts 75 to release stop members 70, wing nuts 45 are loosened to permit transverse member 39 to be lowered or raised relative to vertical supports 20 by sliding therealong to the desired elevational location. Wing nuts 45 are tightened again to secure transverse member 39 at its new location, thereby fixing the new location of the back edge of tray base 31. Then tray base 31 is manually held at the desired angular orientation, stop members 70 are slid against connecting members 65, and wing nuts 75 are tightened, such latter procedure being the same as previously described in connection with adjusting only the angular orientation.

Alternatively, as shown in phantom at 31" in FIGURE 4, tray base 31 can be attached to lower transverse member 40. In this configuration, the tray base eyelets 41 will encircle lower transverse member 40, and eyelets 51 (associated with support arm 50) will encircle upper transverse member 39. Note that track 60" now will be on the "upper" surface of the tray base, and support arm 50" will extend angularly upward toward transverse member 39. Of course, the stop member 70 will be located rearwardly of the support arm 50" as indicated at 70".

When not in use, pet tray 10 may be removed from seat 14 and folded into the collapsed position shown in FIGURE 2. Thus folded, pet tray 10 may be carried with ease, or conveniently stored in a minimum of space.

It should be noted that the tubes 42 and 52 are in slip fit relationship to rods 43 and 53, not only for ease of assembly, disassembly, and concentric relative rotation during pivotal rotation of tray base 31 and angular support arms 50, but also for permitting relative sliding movement in their axial directions whereby either or both of the vertical supports 20 may be moved laterally outwardly from tubes 42 and 52 and concomitantly from tray base 31 for greater spaced distance therebetween to accommodate variously shaped seat backs or, in the case of bucket seats, to dispose the supports 20 on separate seat backs with the tray base 31 located between the seats. Of course, the spatial separation of vertical supports 20 is limited to the extent that rods 43 and 53 can be only partially withdrawn from tubes 42 and 52, bearing in mind the transverse support and pivotal rotation functions.

While numerous modifications will occur to those skilled in the art upon reading the foregoing description of the illustrated preferred embodiment, one such modification may be noted here, i.e., eyelets 41 and 51 may be rigidly secured to their respective tubes 42 and 52 so as to be unitary therewith, thus relying upon the concentrically rotatable relationship of tubes 42 and 52 with respect to rods 43 and 53 for the pivotal functions previously described. Also, rods 43 and 53 need not be solid but may be tubular instead.

It has been seen that rods 43 are attached to support members 20 by sliding support portion 22 through slot 46. As previously described, bolt 27 extends through hole 49 and longitudinal slot 23 and, releasably fastened by wing nut 45, secures rod 43 to support member 20 as by resiliently squeezing the slotted portion of rod 43. In the novel modified embodiment illustrated in FIGURE 10, substantially semi-cylindrical locking member 44 is employed intermediate the rod 43 and the wing nut 45 and has a central hole 44' for receiving bolt 27 therethrough whereby fastening action of wing nut 45 causes bolt head 27' and locking member 44 to be drawn toward each other. Locking member 44 has an axial length greater than the width of slot 23 so as to bear against the lateral portions of vertical support portion 22 which define slot 23, and an arcuate length greater than the corresponding arcuate length of rod 43 between bolt 27 and support portion 22 (as by locking member 44 having a greater internal radius than the outer radius of rod 43, or having the same internal radius but an arcuate length greater than half a circle) whereby locking member edges 44" are caused to forcibly resiliently bear against support portion 22 while the main body of locking member 44 similarly bears against rod 43 when wing nut 45 is tightened on bolt 27. Thereby, locking member edges 44" frictionally engage vertical support portion 22 while bolt 27 and wing nut 45 capture rod 43 with respect to locking member 44. Thus, each end of the transverse or horizontal support means is very readily and reliably selectively releasably secured to the corresponding one of the vertical support means or selectively slid therealong when in the released condition during vertical adjustment of the tray base 31 height and angular orientation adjustment functions.

While the foregoing description has been directed to use of the invention as a pet tray, clearly it is not so limited. For example, the device could be used as an automobile writing table. Also, tray base 31 could be provided with appropriate openings or depressed areas so as to function as a car tray for dishes or other objects.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. An adjustable tray apparatus comprising:
   a pair of parallel elongate vertical support members adapted for supported engagement with an automobile seat back;
   a parallel pair of horizontal support means extending between and secured to said vertical support members;
   a tray base having an edge mounted on one of said horizontal support means;
   a pair of parallel track means secured to said tray base at right angles to said base edge;
   a pair of connecting means each in slidable engagement with a respective one of said track means; and
   a pair of angular support arms each having a first end pivotally connected to a respective one of said connecting means and a second end mounted on the other one of said horizontal support means,
   said tray base edge and said second ends of said angular support arms being pivotally rotatable about the respective axes of said pair of horizontal support means for adjustable angular orientation of said tray base relative to said vertical support members.

2. Apparatus in accordance with claim 1 further comprising a pet cushion disposed on said tray base and provided with attachment means for releasable attachment to said tray base.

3. Apparatus in accordance with claim 1 wherein each of said pair of horizontal support means comprises a tube and a pair of rods partially received by said tube through opposite ends thereof in slidable and rotatable engagement therewith, each of said rods having an outer end secured to a respective one of said vertical support members, whereby said vertical support members may be selectively individually laterally moved relative to each other and said tray base.

4. Apparatus in accordance with claim 3 further comprising a pet cushion disposed on said tray base and provided with attachment means for releasable attachment to said tray base.

5. Apparatus in accordance with claim 1 wherein said tray base edge and said second ends of said angular support arms are selectively respectively mountable on either of said pair of horizontal support means whereby said tray base is selectively disposable in revesible attitudes.

6. Apparatus in accordance with claim 5 wherein each of said pair of horizontal support means comprises a tube and a pair of rods partially received by said tube through opposite ends thereof in slidable and rotatable engagement therewith, each of said rods having an outer end secured to a respective one of said vertical support members, whereby said vertical support members may be selectively individually laterally moved relative to each other and said tray base.

7. Apparatus in accordance with claim 6 further comprising a pet cushion disposed on said tray base and provided with attachment means for releasable attachment to said tray base.

8. Apparatus in accordance with claim 1 wherein said one horizontal support means has a pair of outer ends in selectively releasably securable vertically slidable engagement with said vertical support members whereby said tray base may be selectively adjusted in vertical location relative to said vertical support members.

9. Apparatus in accordance with claim 8 wherein each of said pair of horizontal support means comprises a tube and a pair of rods partially received by said tube through opposite ends thereof in slidable and rotatable engagement therewith, each of said rods having an outer end secured to a respective one of said vertical support members, whereby said vertical support members may be selectively individually laterally moved relative to each other and said tray base.

10. Apparatus in accordance with claim 9 wherein said tray base edge and said second ends of said angular support arms are selectively respectively mountable on either of said pair of horizontal support means whereby said tray base is selectively disposable in reversible attitudes.

11. Apparatus in accordance with claim 10 further comprising a pet cushion disposed on said tray base and provided with attachment means for releasable attachment to said tray base.

12. Apparatus in accordance with claim 8 wherein each of said vertical support members is provided with a central longitudinal slot, each of said outer ends of said horizontal support means is provided with a vertical slot in slidably receiving engagement with its corresponding said vertical support member, and including a transverse bolt passing horizontally through said outer end and both of said slots, and a nut threadably fastenable on one end of said bolt.

13. Apparatus in accordance with claim 12 including a locking member disposed on said bolt intermediate said nut and said outer end, said locking member having a substantially semi-cylindrical configuration disposed in partially encircling capturing relationship to said outer end and having a pair of longitudinal edges each in frictionally engaged abutment with said vertical support member when said nut is tightened on said bolt.

14. Apparatus in accordance with claim 13 wherein each of said pair of horizontal support means comprises a tube and a pair of rods partially received by said tube through opposite ends thereof in slidable and rotatable engagement therewith, each of said rods having one of said outer ends, whereby said vertical support members may be selectively individually laterally moved relative to each other and said tray base.

15. Apparatus in accordance with claim 14 wherein said tray base edge and said second ends of said angular support arms are selectively respectively mountable on either of said pair of horizontal support means whereby said tray base is selectively disposable in reversible attitudes.

16. Apparatus in accordance with claim 15 further comprising a pet cushion disposed on said tray base and provided with attachment means for releasable attachment to said tray base.

References Cited

UNITED STATES PATENTS

| 2,304,705 | 12/1942 | Pate | 108—43 XR |
|---|---|---|---|
| 2,173,569 | 9/1939 | Troendle. | |
| 2,556,724 | 6/1951 | Hubsch | 108—134 XR |
| 2,687,336 | 8/1954 | Smith et al. | |
| 2,856,251 | 10/1958 | Garrison | 108—44 |
| 2,932,544 | 4/1960 | Lambert. | |

BOBBY R. GAY, *Primary Examiner.*

G. O. FINCH, *Assistant Examiner.*